US007636144B2

(12) United States Patent
Horiguchi et al.

(10) Patent No.: US 7,636,144 B2
(45) Date of Patent: Dec. 22, 2009

(54) LIQUID CRYSTAL DISPLAY DEVICE AND METHOD OF MANUFACTURING THE SAME

(75) Inventors: Masahiro Horiguchi, Tottori (JP); Hideki Kaneko, Tottori (JP)

(73) Assignee: Epson Imaging Devices Corporation (JP)

( * ) Notice: Subject to any disclaimer, the term of this patent is extended or adjusted under 35 U.S.C. 154(b) by 143 days.

(21) Appl. No.: 12/009,785

(22) Filed: Jan. 22, 2008

(65) Prior Publication Data

US 2008/0180622 A1  Jul. 31, 2008

(30) Foreign Application Priority Data

Jan. 25, 2007 (JP) ............... 2007-014660

(51) Int. Cl.
 *G02F 1/1343* (2006.01)
(52) U.S. Cl. ............... 349/141; 349/142
(58) Field of Classification Search .......... 349/141–142
 See application file for complete search history.

(56) References Cited

U.S. PATENT DOCUMENTS

| | | | |
|---|---|---|---|
| 6,562,645 B2 | 5/2003 | Sung et al. | |
| 6,710,835 B2 | 3/2004 | Kurahashi et al. | |
| 7,088,409 B2 | 8/2006 | Itou et al. | |
| 7,486,351 B2 * | 2/2009 | Itou et al. | ............. 349/99 |
| 2003/0202140 A1 | 10/2003 | Liu | |
| 2006/0192912 A1 | 8/2006 | Itou et al. | |

FOREIGN PATENT DOCUMENTS

| | | |
|---|---|---|
| JP | 2001-235763 | 8/2001 |
| JP | 2002-090781 | 3/2002 |
| JP | 2002-182230 | 6/2002 |
| JP | 2002-221736 | 8/2002 |
| JP | 2005-338256 | 12/2005 |
| KR | 2006-0001165 | 1/2006 |

* cited by examiner

*Primary Examiner*—David Nelms
*Assistant Examiner*—Phu Vu
(74) *Attorney, Agent, or Firm*—Harness, Dickey & Pierce, P.L.C.

(57) ABSTRACT

A method of manufacturing a liquid crystal display device 10A according to an embodiment of the present invention includes: forming a pixel electrode 19a for each sub-pixel on the surface of a planarization film 18, forming an insulator 20 over the whole surface, simultaneously forming first to third contact holes 21a to 21c so that a drain electrode D, a connection portion $16_1$ of a common line, and the pixel electrode 19a are exposed from the surface of the insulator 20, forming a film of a transparent conductive material over the whole surface, forming a common electrode 22a including a plurality of slits for each sub-pixel, and connecting the common electrode 22 and the connection portion $16_1$ via the first contact hole 21a and connecting the pixel electrode 19a and the drain electrode D via an interface-structured conductive path 23 formed via the second contact hole 21b, the surface of the insulator 20, and the third contact hole 21c. Accordingly, the invention provides an FFS mode liquid crystal display device and a method of manufacturing the same in which the plurality of contact holes can be formed simultaneously in a single step and the pixel electrode and the common electrode are disposed on the planarization film.

8 Claims, 14 Drawing Sheets

LIQUID CRYSTAL DISPLAY DEVICE AND METHOD OF MANUFACTURING THE SAME

BACKGROUND

1. Technical Field

The present invention relates to an FFS mode liquid crystal display device which can be manufactured without increasing the number of manufacturing steps, and can achieve a high aperture ratio and high display image quality with a pixel electrode and a common electrode disposed on a planarization film, and a method of manufacturing the same.

2. Related Art

Liquid crystal display devices of a vertical electric field system including a pair of transparent substrates having an electrode and the like formed on the surface, and a liquid crystal layer held between the pair of substrates, in which various pieces of information are displayed by applying voltage to the electrodes on the substrates to realign liquid crystals, have been popularly used. However, a twisted nematic (TN) mode generally used in such liquid crystal display devices of a vertical electric field system has a problem in that the viewing angle is small. Therefore, various liquid crystal display devices using an improved vertical electric field system such as a vertical alignment (VA) mode and a multidomain vertical alignment (MVA) mode have been developed.

Aside from the liquid crystal display devices of a vertical electric field system described above, in-plane switching (IPS) mode or fringe field switching (FFS) mode liquid crystal display devices including a pair of a pixel electrode and a common electrode on only one substrate are also known.

In an IPS mode liquid crystal display device, the pair of electrodes is disposed on a single layer, and liquid crystal molecules are realigned in a direction parallel to the substrate by applying an electric field to liquid crystals in a direction approximately parallel to the substrate. Therefore, IPS mode liquid crystal display devices are also referred to as a liquid crystal display device of a horizontal electric field system, and have the advantage of a significantly large viewing angle compared to the liquid crystal display of a vertical electric field system described above. However, IPS mode liquid crystal display devices have the problem that the liquid crystal molecules above the pixel electrode are not sufficiently driven due to the pair of electrodes being provided in a singe layer for applying an electric field to the liquid crystals, resulting in a decrease in transmission and the like.

In order to solve the problem of IPS mode liquid crystal display devices, liquid crystal display devices using an FFS mode which may be referred to as an oblique electric filed system have been developed (see JP-A-2001-235763 and JP-A-2002-182230). In the FFS mode liquid crystal display device, a pixel electrode and a common electrode for applying an electric field to a liquid crystal layer are respectively disposed in different layers with an insulator therebetween.

FFS mode liquid crystal display devices have a wider viewing angle and a higher contrast compared to IPS mode liquid crystal display devices, and are also capable of a low voltage driving and a bright display due to higher transmission. In addition, FFS mode liquid crystal display devices have a larger area in which the pixel electrode and the common electrode overlap in planar view compared to IPS mode liquid crystal display devices, further resulting in a larger retention volume. Therefore, FFS mode liquid crystal display devices are advantageous in that a storage capacitor line does not need to be additionally provided.

However, since a step is formed on the surface of the pixel electrode which overlaps with a switching element or a common line in a related-art FFS mode liquid crystal display device, liquid crystal molecules are misaligned in the step portion. Therefore, since the step portion of the related-art FFS mode liquid crystal display device is a region which substantially does not contribute to displaying an image, light shielding by a black matrix on a color filter substrate is necessary, whereby the aperture ratio deceases by a share corresponding to the step portion.

In order to eliminate the step portion, the pixel electrode or the common electrode may be disposed on a planarization film such as that used in the liquid crystal display device of the VA system or the MVA system described above. However, with this configuration, two contact holes need to be formed to electrically connect the pixel electrode and the switching element, and the common electrode and the common line, since the switching element and the common line are formed below the planarization film. The two contact holes usually cannot be formed simultaneously since the pixel electrode and the common electrode are disposed in different layers. Thus, there is a problem in that separate steps are necessary to form the contact holes.

SUMMARY

An advantage of some aspects of the invention is to provide an FFS mode liquid crystal display device in which a plurality of contact holes can be formed on a single step when a pixel electrode and a common electrode are disposed on a planarization film, and which has a high aperture ration and a high display image quality.

A liquid crystal display device according to a first aspect of the invention includes a pair of transparent substrates sandwiching a liquid crystal layer, one of the pair of transparent substrates on the liquid crystal layer side being provided with a plurality of scan lines and a plurality of signal lines disposed in a matrix in a display region, a switching element provided near an intersection of the plurality of scan lines and the plurality of signal lines, a common line formed along a periphery portion of the display region, a planarization film formed over at least the whole display region, a first electrode formed on a surface of the planarization film, an insulator formed on the first electrode, and a second electrode formed on the insulator and having a plurality of slits for each position corresponding to a region divided by the plurality of scan lines and the plurality of signal lines, the second electrode being electrically connected with the common line or the switching element via a first contact hole formed on the insulator and the planarization film, the fir electrode being electrically connected with the switching element or the common line, different from the common line or the switching element with which the second electrode is electrically connected, via an interface-structured conductive path, formed of a material used for forming the second electrode, formed via a second contact hole on the insulator, a surface of the insulator, and a third contact hole formed on the insulator and the planarization film.

In the liquid crystal display device according to the first aspect, it is necessary that the second electrode provided to the surface of the insulator have the plurality of slits formed for each position (hereinafter referred to as "sub-pixel region") corresponding to the region divided by the plurality of scan lines and the plurality of signal lines. The liquid crystal display device according to the first aspect can create a fringe field effect by an electric field applied between the first electrode and the second electrode for each sub-pixel region via the slit.

It is necessary that the plurality of slits be formed in a direction parallel to each other, but there may be a group of slits formed in a plurality of different directions within a pixel. Such a configuration allows reduction of change in image quality depending on the vision angle.

In the first aspect, indium tin oxide (ITO), indium zinc oxide (IZO), or the like may be used to form the first electrode and the second electrode. In this case, the first electrode and the second electrode may have the same composition or different compositions.

In the first aspect, a three-terminal element such as a polysilicon (p-Si) thin film transistor (TFT) element, an amorphous silicon (a-Si) TFT element, and a low temperature polysilicon (LTPS) TFT element, or a two-terminal nonlinear element such as a thin film diode (TFD) element may be used as the switching element.

As the planarization film of the first aspect, a transparent insulator having at least a flat surface may be used. For example, a transparent resin such as an acrylic resin or a polyimide resin may be used. Further, as the insulator of the first aspect, an inorganic insulator such as a silicon oxide film or a silicon nitride film may be used.

In the liquid crystal display device of the first aspect, three contact holes are formed. Since the contact holes all extend through the insulator on the first electrode, the three contact holes can be formed simultaneously in a single step. In addition, since the interface-structured conductive path is formed of the same material as that of the second electrode, an electrical conduction can be achieved between the first electrode and the switching element or the common line and between the second electrode and the common line or the switching element via each of the contact holes simultaneously with the formation of the second electrode, in the liquid crystal display device of the invention. Therefore, according to the first aspect, an FFS mode liquid crystal display device which can be manufactured without necessarily increasing the number of manufacturing steps, and in which the first electrode and the second electrode are formed on the planarization film can be provided.

In the liquid crystal display device of the first aspect, the insulator between the first electrode and the second electrode functions as a dielectric film which forms a storage capacitor. Therefore, in the liquid crystal display device of the first aspect, the size of the storage capacitor can easily be adjusted by adjusting the thickness of the insulator. For example, in the case where it is necessary to increase the size of the storage capacitor per unit area, such as in the case where the area of each pixel is reduced to obtain a high-resolution liquid crystal display device, a sufficient size of the storage capacitor can be obtained by reducing the thickness of the insulator which functions as a dielectric.

In addition, since the electric field strength increases in inverse proportion to the distance between the electrodes when the voltage applied between the first electrode and the second electrode is constant, the electric field strength between the first electrode and the second electrode increases when the thickness of the insulator is reduced. Therefore, a predetermined electric field strength for driving the liquid crystal molecules can be obtained even if the voltage applied between the first electrode and the second electrode is reduced, when the thickness of the insulator is reduced. Thus, according to the first aspect, a liquid crystal display device which has an improved display quality, allows low voltage driving, and achieves a lower power consumption can be provided.

Further, since the surfaces of the switching element and the common line are coated by the planarization film in the liquid crystal display device of the first aspect, a step is not formed in the second electrode as in the case of a related-art FFS mode liquid crystal display device. Therefore, in the liquid crystal display device of the first aspect, the interval (i.e., cell gap) between the other transparent substrate and the second electrode is formed uniformly, and the aperture ratio increases since the area of a region decreases in which light shielding by the black matrix is necessary in the display region. Thus, according to the first aspect, an FFS mode liquid crystal display device which is bright, has an excellent display image quality, and may be suitably used as a liquid crystal display device having a reduced size and increased resolution can be obtained.

In the first aspect, it is preferable that the first electrode be formed on the surface of the planarization film in the display region for each position corresponding to the region divided by the plurality of scan lines and the plurality of signal lines, each first electrode being electrically connected with the corresponding switching element, and the second electrode be formed at least over the whole surface of the display region of the insulator and connected with the common line.

Accordingly, an FFS mode liquid crystal display device having the advantageous effect of the first aspect, in which the second electrode on the surface of the insulator is the common electrode and the first electrode formed for each sub-pixel region below the insulator is the pixel electrode connected with the switching element, can be obtained.

In the first aspect, it is preferable that the interface-structured conductive path be formed for each of the sub-pixel regions.

Accordingly, the first electrode, functioning as the pixel electrode, for each sub-pixel region can be electrically connected with the switching element while ensuring insulation with the second electrode at the surface of the insulator.

In the first aspect, it is preferable that a plurality of connections be formed between the second electrode and the common line.

Accordingly, a connection resistance between the second electrode and the common line can be reduced, whereby the degree of degradation of a signal applied to the second electrode via the common line due to a line resistance can be reduced. Thus, a liquid crystal display device having an excellent display image quality can be obtained.

In the first aspect, it is preferable that the first electrode be formed over the whole surface of the planarization film in the display region and connected with the common line, and the second electrode be formed for each position corresponding to the region divided by the plurality of scan lines and the plurality of signal lines on the surface of the insulator in the display region, each second electrode being electrically connected with the corresponding switching element.

Accordingly, an FFS mode liquid crystal display device having the advantageous effect of the first aspect, in which the second electrode formed for each sub-pixel region on the surface of the insulator is the pixel electrode connected with the switching element and the first electrode below the insulator is the common electrode connected with the common line, can be obtained.

In the first aspect, it is preferable that the interface-structured conductive path be formed at a boundary portion between the common line and the display region.

Accordingly, the first electrode functioning as the common electrode can be electrically connected with the common line while ensuring insulation with the second electrode at the surface of the insulator, since the second electrode functioning as the pixel electrode is formed only in the display region.

In the first aspect, it is preferable that the interface-structured conductive path be provided in plurality.

Accordingly, a connection resistance between the first electrode and the common line can be reduced, whereby the degree of degradation of a signal applied to the first electrode via the common line due to a line resistance can be reduced. Thus, a liquid crystal display device having an excellent display image quality can be obtained.

A method of manufacturing a liquid crystal display device according to a second aspect of the invention includes the following steps (1) to (7).

Specifically, the method of manufacturing a liquid crystal display device includes (1) preparing a first transparent substrate including a plurality of scan lines and a plurality of signal lines formed in a matrix in a display region, a switching element provided near an intersection of the plurality of scan lines and the plurality of signal lines, and a common line formed along a periphery portion of the display region, (2) forming a planarization film over the whole display region of the first transparent substrate, (3) forming a first electrode on a surface of the planarization film, (4) forming an insulator over the whole surface of the resulting first transparent substrate after (3), (5) forming first and third contact holes in the insulator and the planarization film to expose the switching element and the common line, and forming a second contact hole in the insulator to expose the first electrode, (6) forming a film formed of a conductive material over the whole surface of the resulting transparent substrate after (5), forming by etching a second electrode including a plurality of slits for each position corresponding to a region divided by the plurality of scan lines and the plurality of signal lines, electrically connecting the second electrode and the switching element or the common line via the first contact hole, and electrically connecting the first electrode and the common line or the switching element via an interface-structured conductive path formed via the second contact hole, a surface of the insulator, and the third contact hole, and (7) disposing a second transparent substrate to face a surface of the resulting first transparent substrate after (6) at a predetermined distance, and encapsulating a liquid crystal between the first and second transparent substrates.

With the method of manufacturing a liquid crystal display device of the second aspect, the first to third contact holes can be manufactured in a single step, whereby a liquid crystal display device having the advantageous effect of the first aspect can be manufactured without necessarily increasing the number of manufacturing steps.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described below by way of examples with reference to the drawings. Note that the embodiments shown below exemplify an FFS mode liquid crystal display device as a liquid crystal display device for embodying the technical idea of the invention. The embodiments are not intended to limit the invention to the FFS mode liquid crystal display device, and can also be applied to other embodiments within the scope of the appended claims.

First Embodiment

Figure 1:
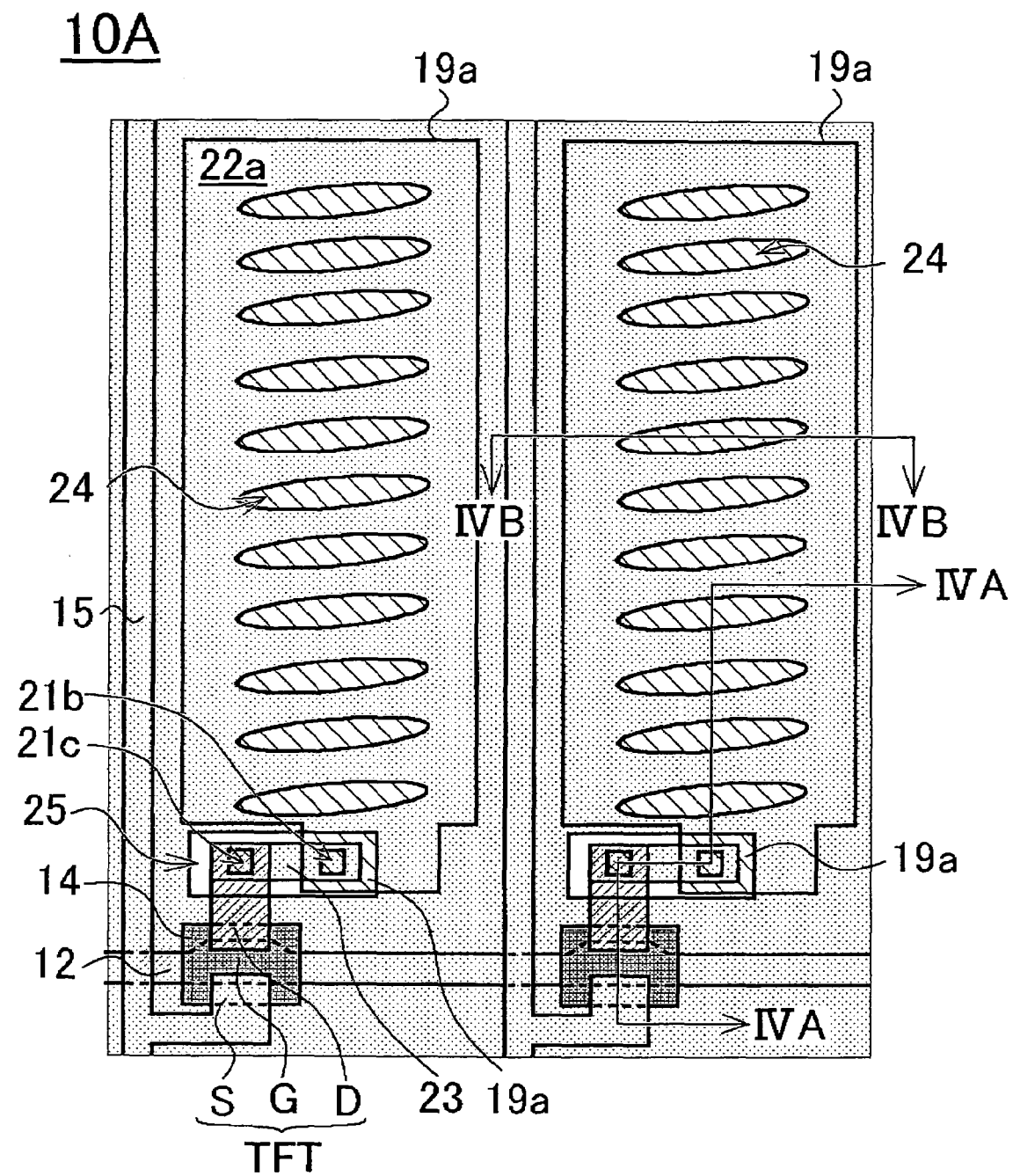
FIG. 1 is a schematic plan view showing two pixels of an array substrate of a liquid crystal display device according to a first embodiment.
Figure 2:
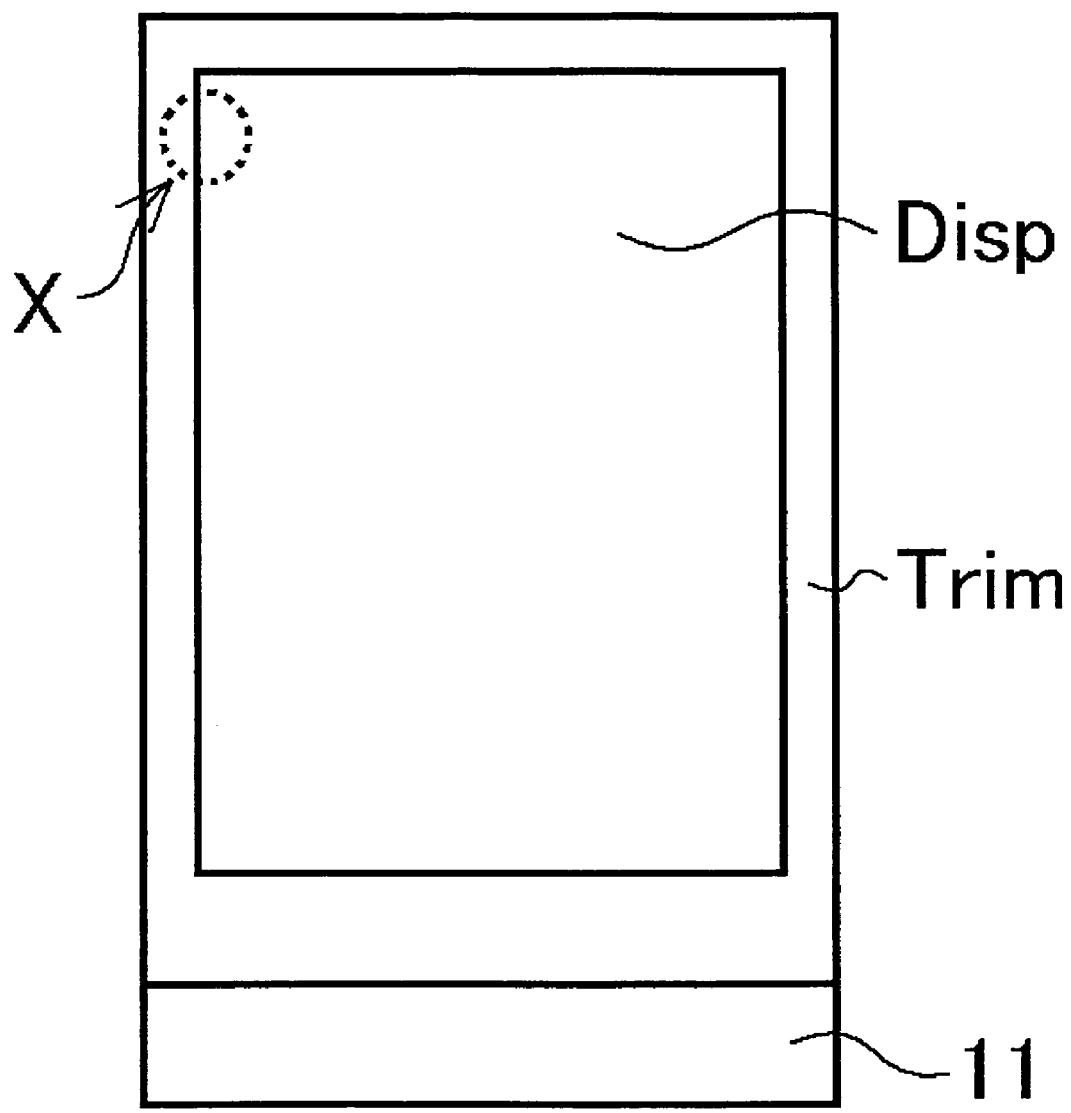
FIG. 2 is a view showing a connection position X of a common line and a common electrode of the liquid crystal display device.
Figure 3:
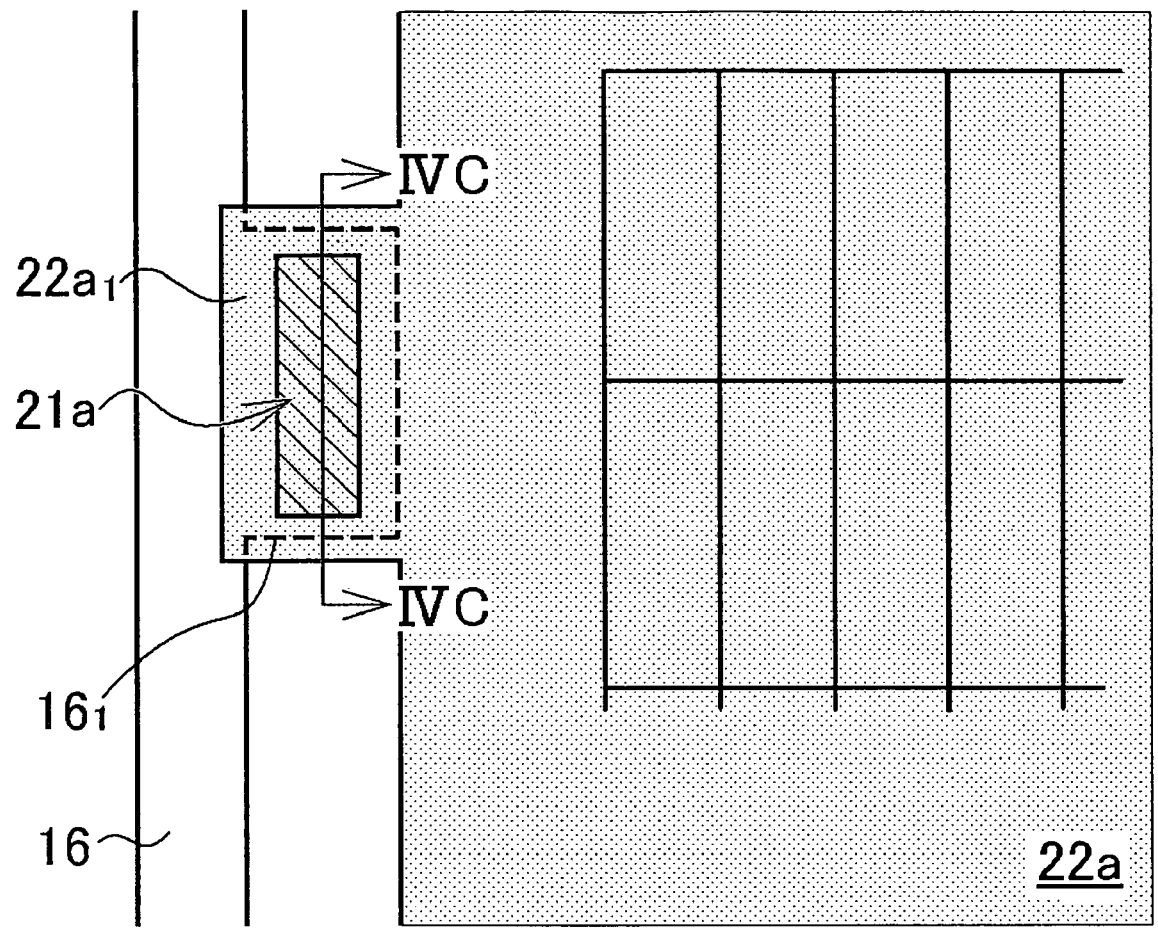
FIG. 3 is an enlarged plan view of the array substrate at an X portion of the liquid crystal display device according to the first embodiment.
Figure 4A:
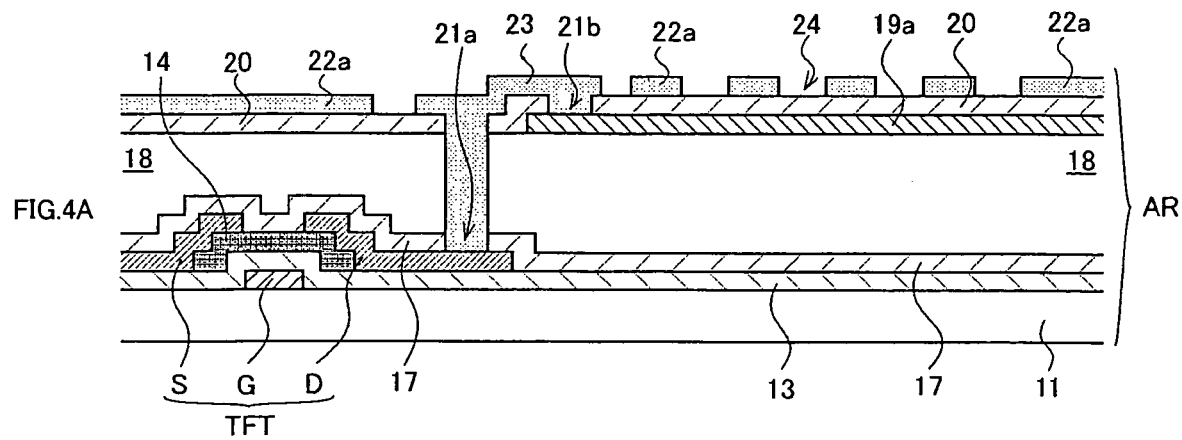
FIG. 4A is a schematic sectional view along the line IVA-IVA of FIG. 1.
Figure 4B:
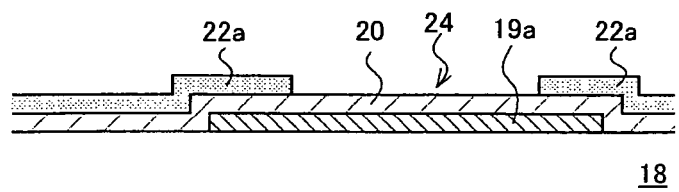
FIG. 4B is a schematic sectional view along the line IVB-IVB of FIG. 1.
Figure 4B:
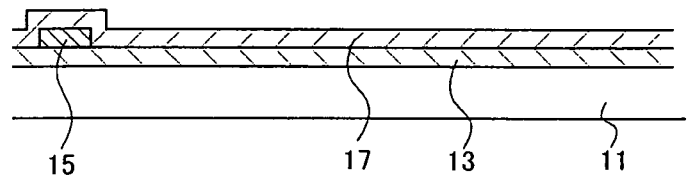
Figure 4C:
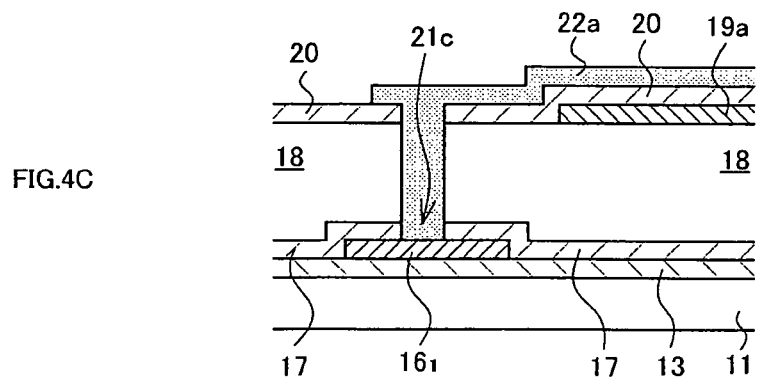
FIG. 4C is a schematic sectional view along the line IVC-IVC of FIG. 3.
Figure 5:
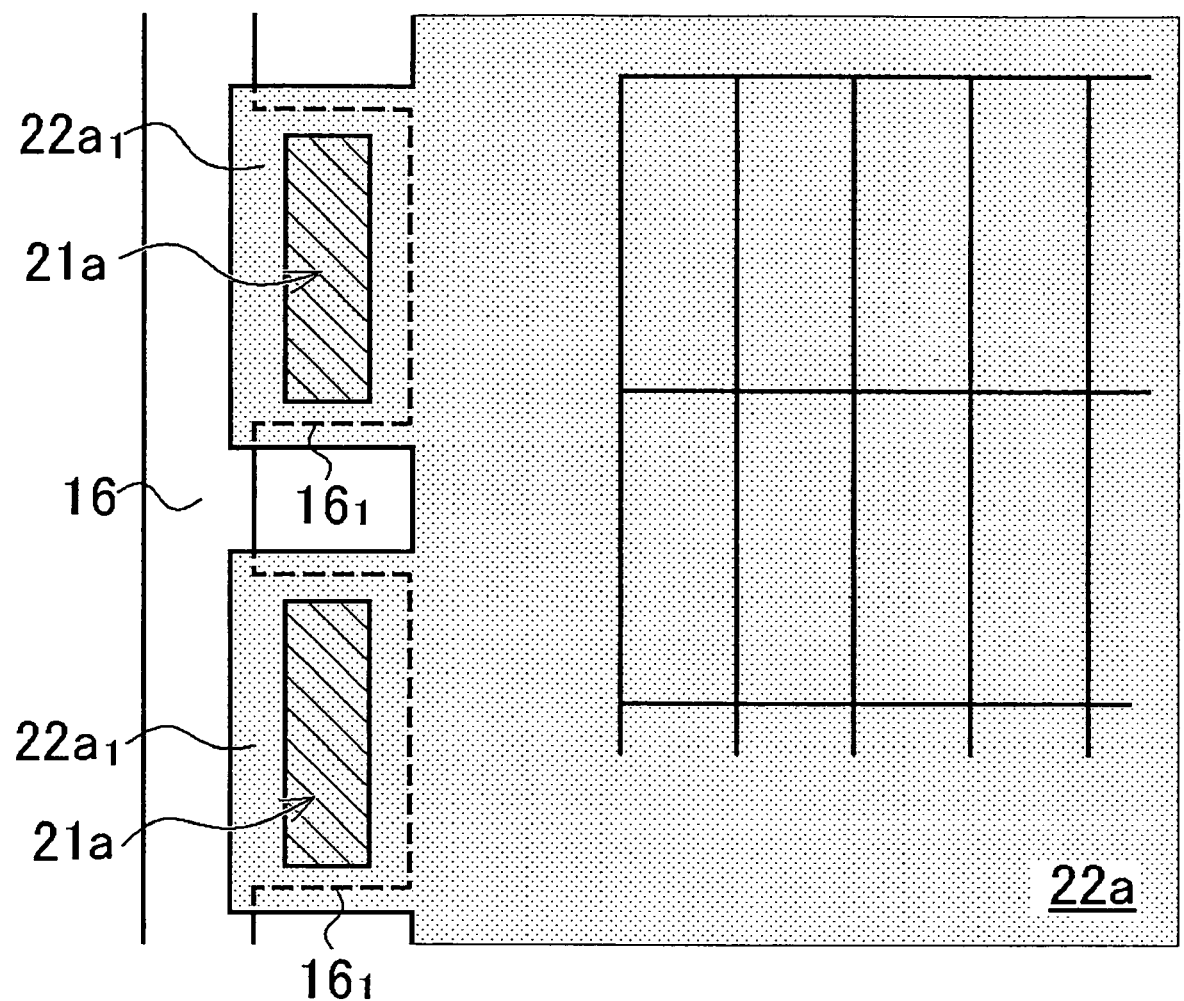
FIG. 5 is an enlarged plan view of the array substrate at the X portion in a modified example of the liquid crystal display device according to the first embodiment.

As an FFS mode liquid crystal display device according to a first embodiment, an FFS mode liquid crystal display device which includes a planarization film and in which an upper electrode as a common electrode is connected with a common line is described in the order of the manufacturing steps using FIGS. 1 to 5. FIG. 1 is a schematic plan view showing two pixels of an array substrate of a liquid crystal display device 10A according to the first embodiment. FIG. 2 is a view showing a connection position X of the common line and the common electrode of the liquid crystal display device according to the first embodiment. FIG. 3 is an enlarged plan view of the array substrate at an X portion of the liquid crystal display device 10A according to the first embodiment. FIG. 4A is a schematic sectional view along the line IVA-IVA of FIG. 1, FIG. 4B is a schematic sectional view along the line IVB-IVB of FIG. 1, and FIG. 4C is a schematic sectional view along the line IVC-IVC of FIG. 3. FIG. 5 is an enlarged plan view of the array substrate at the X portion in a modified example of the liquid crystal display device according to the first embodiment.

In the manufacture of an array substrate AR of the FFS mode liquid crystal display device 10A according to the first embodiment, a conductive layer such as a metal film is first formed over the whole surface of a transparent substrate 11 such as a glass substrate. Then, a plurality of scan lines 12 are formed to be parallel with each other in a display region and a gate line (not shown) is formed in the periphery (hereinafter referred to as "trim region") of the display region, by a known photolithography method and etching method. The gate line is not necessarily used as a line for scanning, and is referred to as the "gate line" because the material is the same as that of the scan line. The gate line may be used in various appropriate linings.

Next, a gate insulator 13 formed of a silicon nitride layer or a silicon oxide layer is coated over the whole surface. Then, an amorphous silicon (hereinafter referred to as "a-Si") layer, for example, is coated over the whole surface of the gate insulator 13 by a chemical vapor deposition (CVD) method, and then a semiconductor layer 14 is formed from the a-Si layer in a TFT forming region by the photolithography method and the etching method. A region of the scan line 12 at which the semiconductor layer 14 is formed forms a TFT gate electrode G.

Next, a conductive layer configured of a metal film is coated over the whole surface of the transparent substrate 11 to which the semiconductor layer 14 is provided. Further, the conductive layer configured of the metal film is formed into a signal line 15 including a source electrode S so as to be perpendicular to the scan line 12 in a display region $D_{isp}$, a drain electrode D in the TFT forming region, and a source line (not shown and a common line 16 in a trim region $T_{rim}$ by a photolithography method and an etching method. The width of the common line 16 is partially increased to form a connection portion $16_1$ at a position corresponding to a connection position X (see FIG. 2) for connecting with a common electrode 22a described below. Note that the source electrode S portion and the drain electrode D portion of the signal line 15 both partially overlap with the surface of the semiconductor layer 14.

Then, a passivation film 17 is coated over the whole surface of the resulting transparent substrate 11 after the steps described above. The passivation film 17 to be used may be formed of a silicon nitride layer or a silicon oxide layer. A silicon nitride layer is preferable in terms of insulation properties. Further, a planarization film (also referred to as "interlayer film") 18 formed of, for example, an acrylic resin or polyimide resin and a transparent conductive layer formed of an ITO or IZO film are sequentially deposited over the whole surface of the passivation film 17.

Next, a pixel electrode 19a is formed for each sub-pixel region by applying a photolithography method and an etching method to the transparent conductive layer. In the liquid crystal display device 10A according to the first embodiment, the pixel electrode 19a corresponds to a first electrode according to the above-described aspect of the invention.

Further, an insulator 20 formed of a silicon nitride layer or silicon oxide layer is formed with a predetermined thickness over the whole surface of the substrate 11 to which the pixel electrode 19a is provided. The insulator 20 functions as a dielectric film which forms a storage capacitor between the pixel electrode 19a and a transparent common electrode 22a which is formed on the surface of the insulator 20 in a step described below. Therefore, the size of the storage capacitor can be adjusted to a desired value by appropriately adjusting the thickness of the insulator.

Next, a first contact hole 21a which extends from the surface of the insulator 20 through the insulator 20, the planarization film 18, and the passivation film 17 to the surface of the connection portion $16_1$ of the common line 16, a second contact hole 21b which extends through the insulator 20 to the surface of the pixel electrode 19a, and a third contact hole 21c which extends through the insulator 20, the planarization film 18, and the passivation film 17 to the surface of the drain electrode D are respectively formed simultaneously. The contact holes 21a to 21c may be formed by a plasma etching method which is one type of dry etching methods.

Next, a transparent conductive layer formed of an ITO or IZO film is formed over the whole surface of the substrate 11 to which the contact holes 21a to 21c are provided. The transparent conductive layer allows the common line 16, the pixel electrode 19a, and the drain electrode D to be electrically connected with each other via the contact holes 21a to 21c.

Then, a common electrode 22a which substantially coats the whole display region is formed by etching the transparent conductive layer by a photolithography method and an etching method. Simultaneously, a plurality of slits 24 for creating parallel fringe field effects are formed for each sub-pixel region on the common electrode 22a, and a conductive path 23 and the common electrode 22a are electrically insulated by providing a frame cutaway portion 25 on the periphery of the conductive path 23. The common electrode 22a has a connection portion $22a_1$ formed at the connection portion X between the common line 16 and the common electrode 22a so as to overlap with the connection portion $16_1$ which is formed by partially increasing the width of the common line 16 in planar view. Note that the slits 24 and the frame cutaway portion 25 are omitted in FIG. 3. In the liquid crystal display device 10A according to the first embodiment, the pixel electrode 22a corresponds to a second electrode according to the above-described aspects of the invention.

In this manner, the common electrode 22a is electrically connected with the common line 16 via the first contact hole 21a, and the pixel electrode 19a is connected with the TFT drain electrode D via the second contact hole 21b, the conductive path 23, and the third contact hole 21c. Then, an alignment layer (not shown) is provided over the whole surface on the common electrode 22a side to complete the array substrate AR of the liquid crystal display device 10A according to the first embodiment.

The color filter substrate facing the array substrate AR described above is omitted in the drawing. However, a color filter substrate substantially similar to that for a related-art FFS mode liquid crystal display device may be used. Specifically, the color filter substrate has a color filter layer of different colors formed at a position facing each pixel electrode, and an alignment layer is provided on the surface of the color filter layer. Further, a black matrix is provided respectively at a position facing the scan line 12 and the signal line 15 between the color filter layer and the transparent substrate, and a position facing a TFT.

In order to form the color filter substrate for the liquid crystal display device 10A according to the first embodiment in particular, a black matrix is further provided at a position facing the conductive path 23 or the frame cutaway portion 25 to shield light leaked therefrom. Next, the array substrate and the color filter substrate described above are respectively arranged to face each other, and liquid crystals are encapsulated therebetween to obtain the liquid crystal display device 10A according to the first embodiment.

In the liquid crystal display device 10A of the first embodiment thus manufactured, three contact holes are formed. Since the contact holes all extend through the insulator 20 on the pixel electrode 19a, the three contact holes can be formed simultaneously in a single step. In addition, since the interface-structured conductive path 23 is formed of the same material as that of the common electrode 22a, an electrical conduction can be achieved between each pixel electrode 19a and the drain electrode D and between the common electrode 22a and the common line 16 via each of the contact holes 21a to 21c simultaneously with the formation of the common electrode 22a, in the liquid crystal display device 10A. Therefore, according to the first embodiment, the FFS mode liquid crystal display device 10A which can be manufactured without necessarily increasing the number of manufacturing steps, and in which the pixel electrode 19a and the common electrode 22a are formed on the planarization film 18 can be obtained.

In the liquid crystal display device 10A of the first embodiment, the insulator 20 between the pixel electrode 19a and the common electrode 22a functions as a dielectric film which forms a storage capacitor. Therefore, the size of the storage capacitor can easily be adjusted by adjusting the thickness of the insulator 20. In addition, since the electric field strength increases in inverse proportion to the distance between the electrodes when the voltage applied between the pixel electrode 19a and the common electrode 22a is constant, the electric field strength between the pixel electrode 19a and the common electrode 22a increases when the thickness of the insulator 20 is reduced. Therefore, a predetermined electric field strength for driving the liquid crystal molecules can be obtained even if the voltage applied between the pixel electrode 19a and the common electrode 22a is reduced, when the thickness of the insulator 20 is reduced. Thus, according to the first embodiment, the liquid crystal display device 10A which has an improved display quality, allows low voltage driving, and achieves a lower power consumption can be obtained.

Further, in the liquid crystal display device 10A of the first embodiment, since the surface of the TFT and the like is coated by the planarization film, a step is not formed in the common electrode 22a as in the case of a related-art FFS mode liquid crystal display device. Therefore, in the liquid crystal display device 10A of the first embodiment, the interval (i.e., cell gap) between the color filter substrate (not shown) and the common electrode 22a is formed uniformly, and the aperture ratio increases since the area of a region in which light shielding by the black matrix is necessary in the display region decreases. Thus, according to the first embodiment, the FFS mode liquid crystal display device 10A which is bright, has an excellent display image quality, and is suitably used as a liquid crystal display device having a reduced size and increased resolution can be obtained.

Second Embodiment

Figure 6:
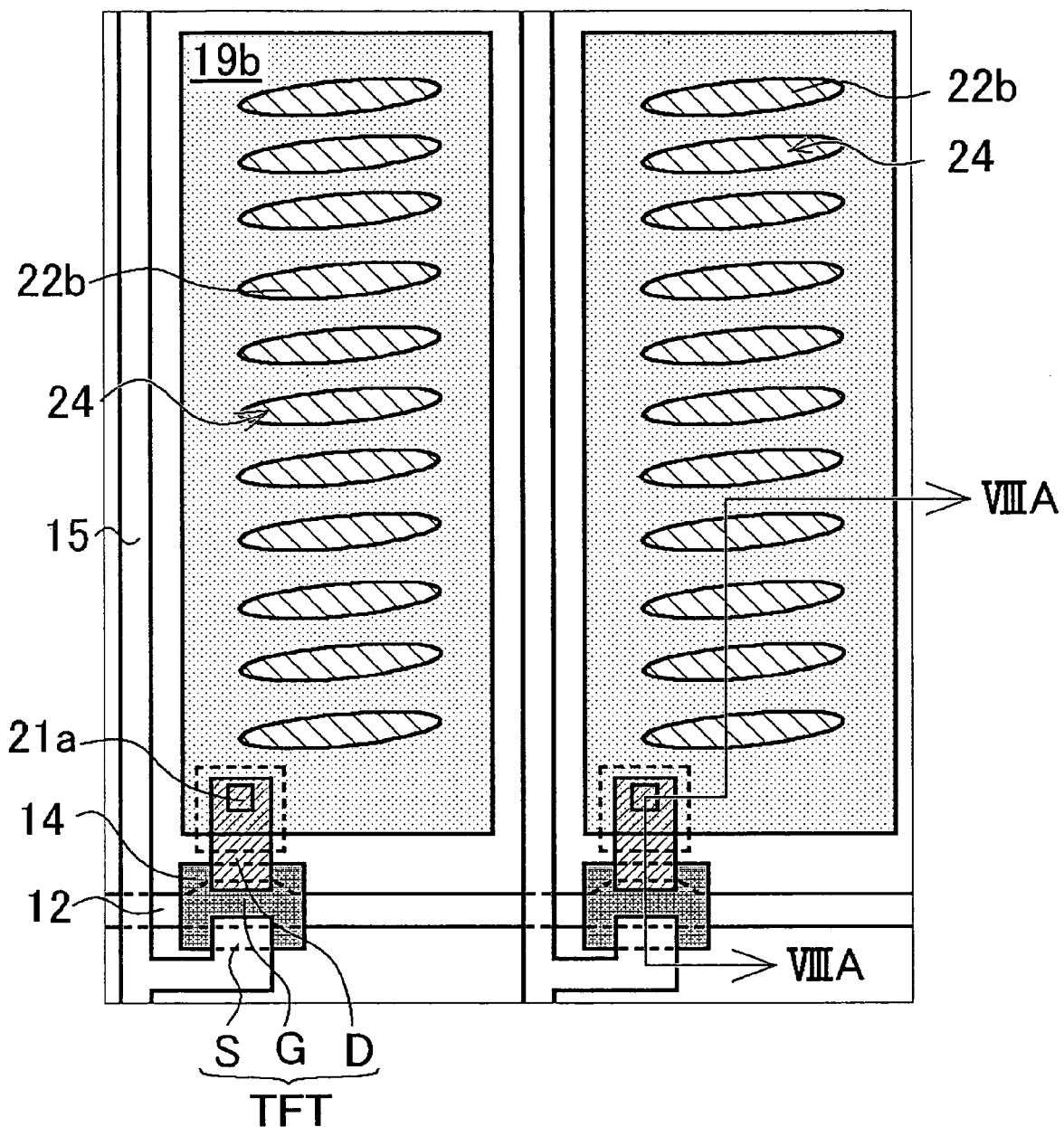
FIG. 6 is a schematic plan view showing two pixels of an array substrate of a liquid crystal display device according to a second embodiment.
Figure 7:
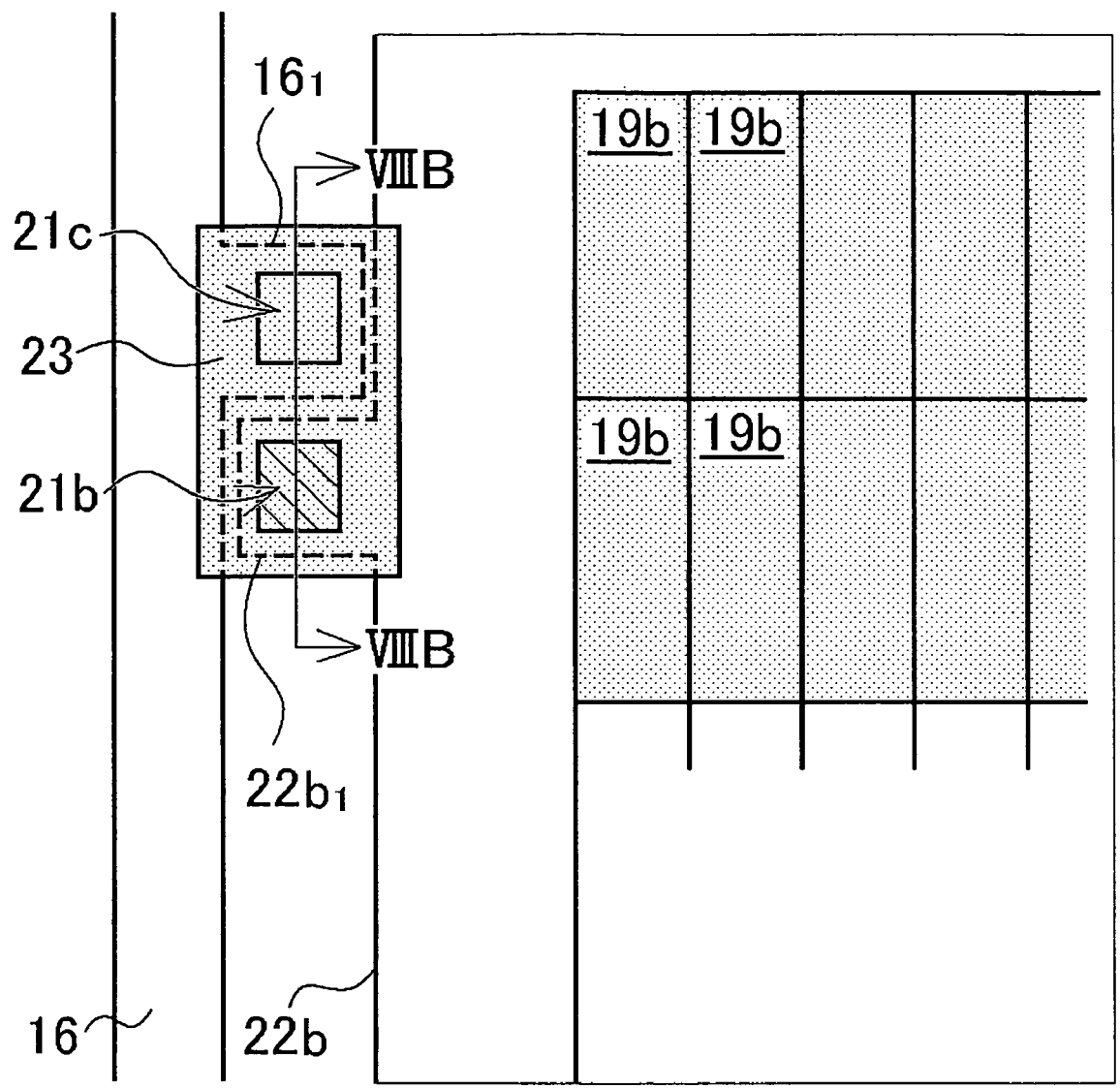
FIG. 7 is an enlarged plan view of the array substrate at an X portion of the liquid crystal display device according to the second embodiment.
Figure 8A:
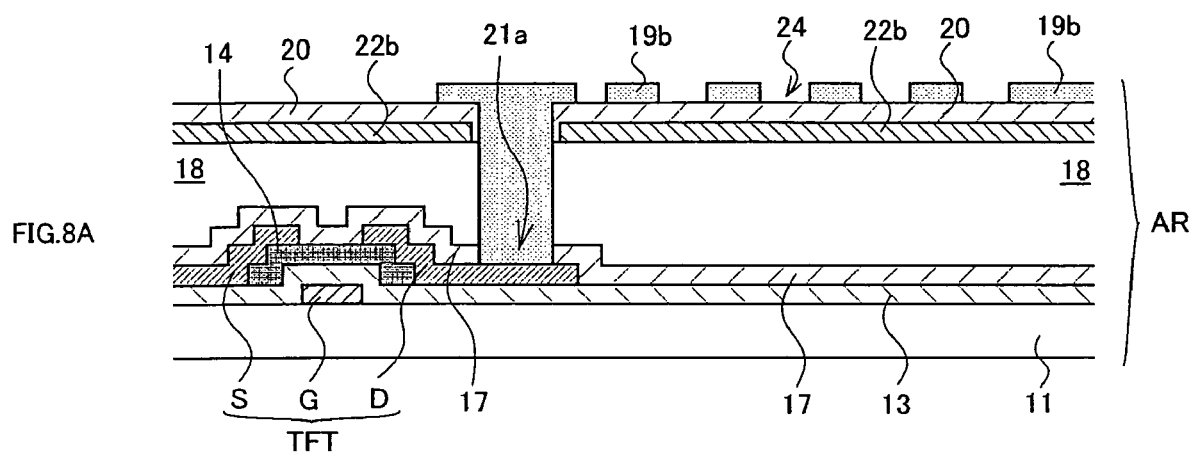
FIG. 8A is a schematic sectional view along the line VIIIA-VIIIA of FIG. 6.
Figure 8B:
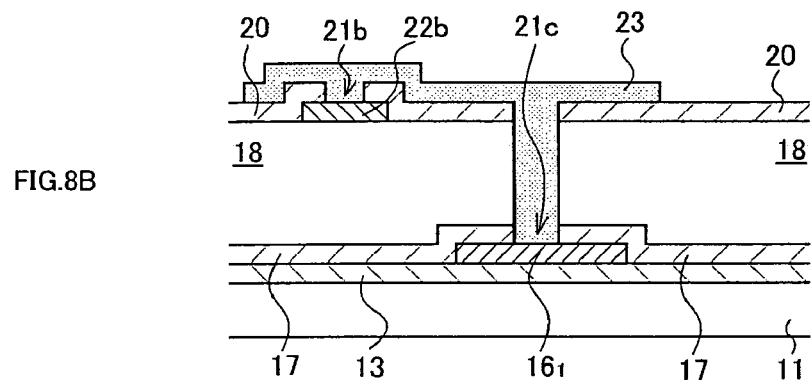
FIG. 8B is a schematic sectional view along the line VIIIB-VIIIB of FIG. 7.
Figure 9:
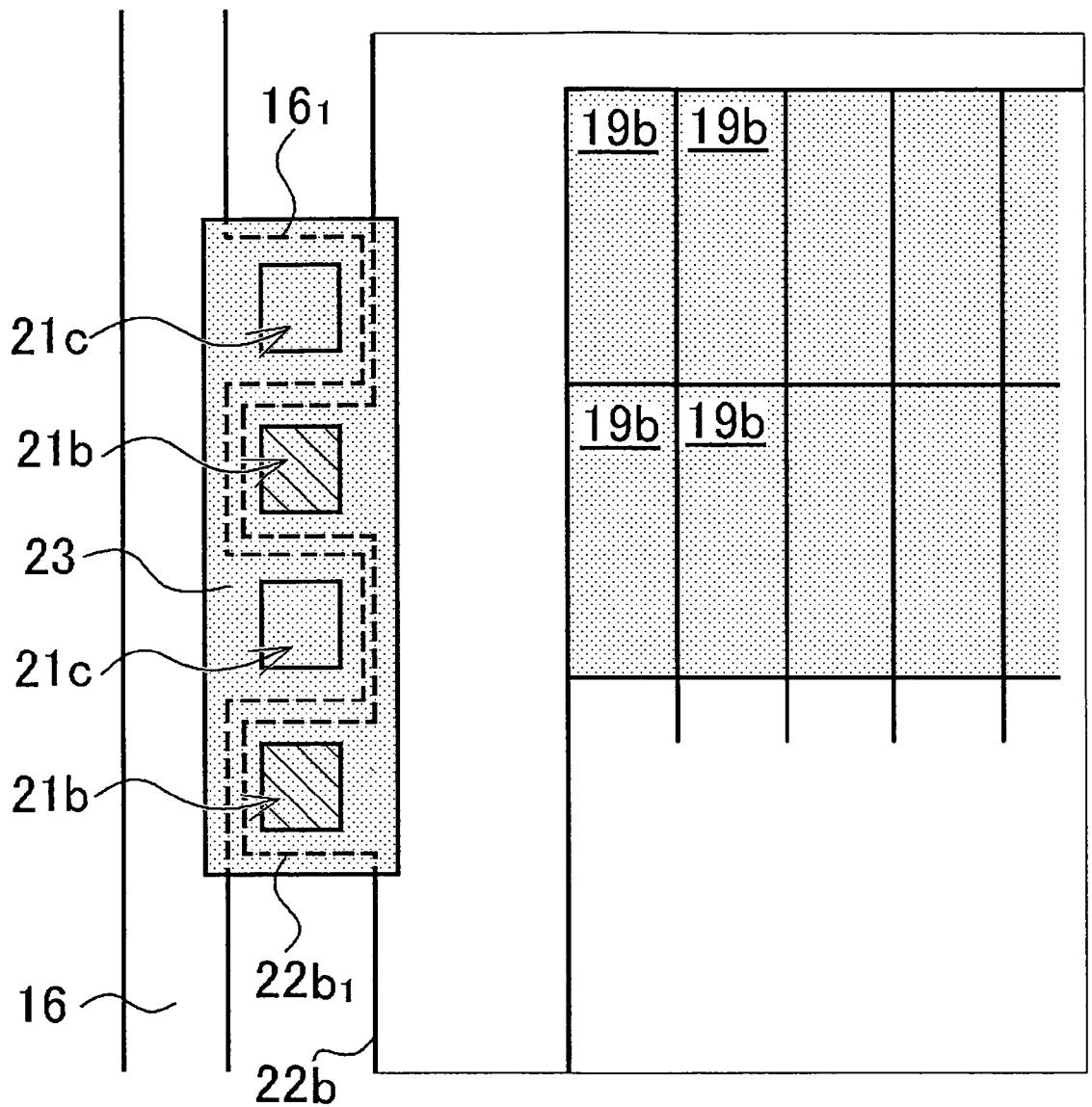
FIG. 9 is an enlarged plan view of the array substrate at the X portion in a modified example of the liquid crystal display device according to the second embodiment.

Next, an example of an FFS mode liquid crystal display device according to a second embodiment, which includes a planarization film and in which a lower electrode as a common electrode is connected with a common line, is described in the order of the manufacturing steps using FIGS. 6 to 9. FIG. 6 is a schematic plan view showing two pixels of an array substrate of the liquid crystal display device according to the second embodiment. FIG. 7 is an enlarged plan view of the array substrate at a connection position between the common line and the common electrode of the liquid crystal display device according to the second embodiment. FIG. 8A is a schematic sectional view along the line VIIIA-VIIIA of FIG. 6, and FIG. 8B is a schematic sectional view along the line VIIIB-VIIIB of FIG. 7. FIG. 9 is an enlarged plan view of the array substrate at a connection position for connecting with the common electrode in a modified example of a liquid crystal display device 10B according to the second embodiment. Note that since the connection position between the common line and the common electrode in the liquid crystal display device 10B according to the second embodiment is similar to the connection position X between the common line and the common electrode in the liquid crystal display device 10A according to the first embodiment shown in FIG. 2, FIG. 2 is appropriately used as a reference.

The steps of forming the scan line 12, the gate insulator 13, the semiconductor layer 14, the signal line 15 including the source electrode S, the drain electrode D, the source line, the common line 16 and the connection portion $16_1$ thereof, the passivation film 17, and the planarization film 18 on the surface of the transparent substrate 11 of the array substrate AR of the FFS mode liquid crystal display device 10B according to the second embodiment are substantially the same as those in the method of manufacturing the array substrate AR of the FFS mode liquid crystal display device 10A according to the first embodiment. Therefore, a detailed description thereof is omitted.

After the planarization film 18 is formed, a transparent conductive layer formed of an ITO or IZO film is formed over the whole surface of the planarization film 18, and a common electrode 22b is formed with a predetermined pattern by a photolithography method and an etching method. A connection portion $22b_1$ is formed in the common electrode 22b at the connection position X (see FIG. 2) between the common line 16 and the common electrode 22b, so as not to overlap with the common line 16 and the connection portion $16_1$ thereof but to be adjacent to the common line 16 and the connection portion $16_1$ thereof in planar view. Simultaneously, a hole slightly larger than the first contact hole 21a is formed on the common electrode 22b at a position where the first contact hole 21a described below is to be formed. In the liquid crystal display device 10B according to the second embodiment, the common electrode 22b corresponds to the first electrode according to the above-described aspect of the invention. Note that the slits 24 are omitted in FIG. 7.

Next, the insulator 20 formed of a silicon nitride layer or silicon oxide layer is formed with a predetermined thickness over the whole surface of the substrate 11 to which the common electrode 22b is provided. At this time, the hole larger than the first contact hole 21a formed on the common electrode 22b is filled with the insulator 20. Next, the first contact hole 21a which extends from the surface of the insulator 20 through the insulator 20, the planarization film 18, and the passivation film 17 to the surface of the drain electrode D, the second contact hole 21b which extends through the insulator 20 to the surface of the common electrode 22b, and the third contact hole 21c which extends through the insulator 20, the planarization film 18, and the passivation film 17 to the surface of the connection portion $16_1$ of the common electrode 16 are respectively formed simultaneously. The common electrode 22b is not exposed at the wall surrounding the contact hole 21a. The contact holes 21a to 21c may be formed by the plasma etching method which is one type of dry etching methods.

Next, a transparent conductive layer formed of an ITO or IZO film is formed over the whole surface of the substrate 11 to which the contact holes 21a to 21c are provided. The transparent conductive layer allows the common line 16, a pixel electrode 19b, and the drain electrode D to be electrically connected with each other via the contact holes 21a to 21c.

Then, the pixel electrode 19b is formed for each sub-pixel region by a photolithography method and an etching method.

Simultaneously, the plurality of slits 24 for creating parallel fringe field effects are formed on each pixel electrode 19b, and the transparent conductive layer around the conductive path 23 is removed so that the conductive path 23 is formed at the connection position X. Such a configuration ensures insulation between the conductive path 23 and each pixel electrode 19b. In the liquid crystal display device 10B according to the second embodiment, each common electrode 19b corresponds to the second electrode according to the above-described aspect of the invention.

In this manner, each pixel electrode 19b is electrically connected with the drain electrode D via the first contact hole 21a, and the common electrode 22b is connected with the common line 16 via the second contact hole 21b, the conductive path 23, and the third contact hole 21c. Then, an alignment layer (not shown) is provided over the whole surface on the common electrode 22b side to complete the array substrate AR of the liquid crystal display device 10B according to the second embodiment. The subsequent manufacturing steps are the same as the manufacturing steps of the liquid crystal display device 10A according to the first embodiment. Therefore, a detailed description thereof is omitted.

In the liquid crystal display device 10B of second embodiment thus manufactured, three contact holes are formed. Since the contact holes all extend through the insulator 20 on the common electrode 22b, the three contact holes can be formed simultaneously in a single step. In addition, since the interface-structured conductive path 23 is formed of the same material as that of the pixel electrode 19b, an electrical conduction can be achieved between each pixel electrode 19b and the drain electrode D and between the common electrode 22b and the common line 16 via each of the contact holes 21a to 21c simultaneously with the formation of the pixel electrode 19b, in the liquid crystal display device 10B. Therefore, according to the second embodiment, the FFS mode liquid crystal display device 10B which can be manufactured without necessarily increasing the number of manufacturing steps, and in which the pixel electrode 19b and the common electrode 22b are formed on the planarization film 18 can be obtained. Note that since other advantageous effects of the liquid crystal display device 10B according to the second embodiment are similar to those of the liquid crystal display device according to the first embodiment, a detailed description thereof is omitted.

First Comparative Example

Figure 10:
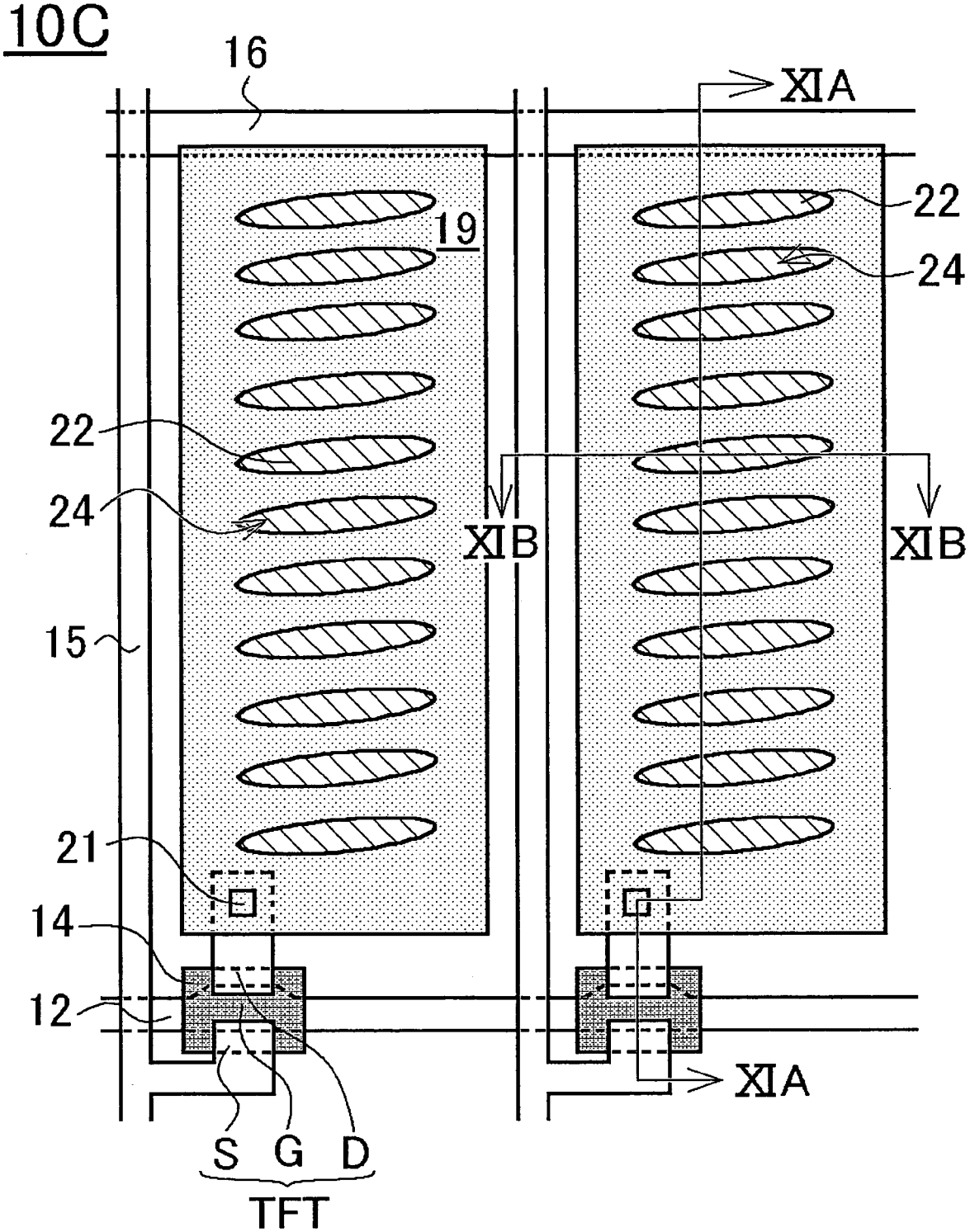
FIG. 10 is a schematic plan view showing two pixels of an array substrate of an FFS mode liquid crystal display device according to a first comparative example.
Figure 11A:
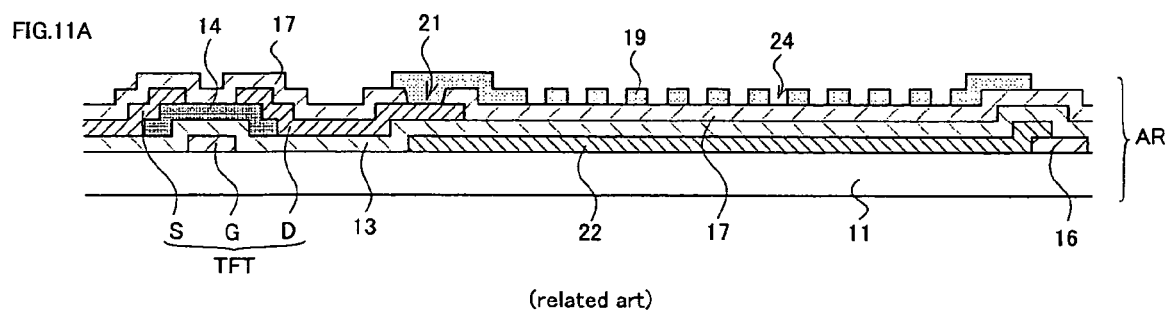
FIG. 11A is a schematic sectional view along the line XIA-XIA of FIG. 10.
Figure 11B:
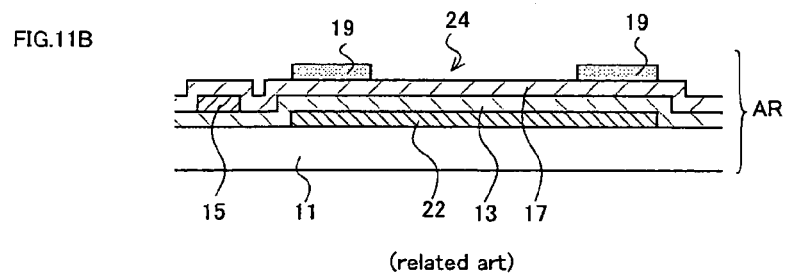
FIG. 11B is a schematic sectional view along the line XIB-XIB of FIG. 10.

Next, in order to confirm the advantageous effects of the liquid crystal display devices according to the embodiments of the invention, an FFS mode liquid crystal display device not having a planarization film is described in the order of the manufacturing steps using FIGS. 10 and 11 as an example of a liquid crystal display device according to a first comparative example. FIG. 10 is a schematic plan view showing two pixels of the array substrate of the FFS mode liquid crystal display device according to the first comparative example, FIG. 11A is a schematic sectional view along the line XIA-XIA of FIG. 10, and FIG. 11B is a schematic sectional view along the line XIB-XIB of FIG. 10. Note that the same components as those of the liquid crystal display device according to the first embodiment shown in FIGS. 1 to 5 are denoted by the same reference symbols in FIGS. 10 and 11.

In the manufacture of the array substrate AR of an FFS mode liquid crystal display device 10C according to the first comparative example, a conductive layer having a metal film or the like on the lower portion is formed over the whole surface of the transparent substrate 11 such as a glass substrate, and then the plurality of scan lines 12 including a gate portion and the plurality of common lines 16 are formed to be parallel with each other by a photolithography method and an etching method.

Next, a transparent conductive layer formed of an ITO or IZO film, for example, is coated over the whole surface of the transparent substrate 11 to which the scan line 12 and the common line 16 are provided, and a common electrode 22 is formed by the photolithography method and the etching method. The common electrode 22 is electrically connected with the common line 16, but not with the scan line 12 or the gate electrode G.

Further, the gate insulator 13 formed of a silicon nitride layer or silicon oxide layer is coated over the whole surface. Then, an a-Si layer, for example, is coated over the whole surface of the gate insulator 13 by a CVD method, and then the semiconductor layer 14 formed of the a-Si layer is formed in a TFT forming region by the photolithography method and the etching method. A region of the scan line 12 at which the semiconductor layer 14 is formed forms the TFT gate electrode G.

Next, a conductive layer configured of a metal film and the like is coated over the whole surface of the transparent substrate 11 to which the semiconductor layer 14 is provided, and the signal line 15, including the source electrode S, and the drain electrode D are formed by the photolithography method and the etching method. The source electrode S portion and the drain electrode D portion of the signal line 15 both partially overlap with the surface of the semiconductor layer 14. Further, the passivation film 17 formed of a silicon nitride layer is coated over the whole surface of the substrate.

Next, a contact hole 21 is formed on the passivation film 17 at a position corresponding to the drain electrode D to partially expose the drain electrode D. Further, a transparent conductive layer formed of an ITO or IZO film, for example, is coated over the whole surface. The drain electrode D is thus electrically connected with the transparent conductive layer via the contact hole 21. Next, a pixel electrode 19, in which the plurality of slits 24 are formed parallel with each other on the passivation film 17 for each region surrounded by the signal line 15 with a specific pattern shown in FIG. 10, is formed by a photolithography method and an etching method. In this state, each pixel electrode 19 is electrically connected with the drain electrode D via the contact hole 21.

Then, an alignment layer (not shown) is provided over the whole surface on the pixel electrode 19 side to complete the array substrate AR of the liquid crystal display device 10C according to the first comparative example. The subsequent manufacturing steps are the same as the manufacturing steps of the liquid crystal display device 10A according to the first embodiment. Therefore, a detailed description thereof is omitted.

Although only one contact hole 21 is necessary for the liquid crystal display device 10C according to the first comparative example having such a configuration since the common electrode 22 and the common line 16 are directly connected, there exists a step in a part of the pixel electrode 19 near the common line 16, whereby the surface of the TFT is uneven. Therefore, in the liquid crystal display device 10C according to the first comparative example, light shielding by a black matrix is necessary for the color filter substrate not only in a portion facing the TFT but also in a portion facing the step portion, whereby the aperture ratio decreases by at least a share corresponding to the step portion.

In addition, since the common line 16 formed of a light-shielding material is disposed between and parallel with the scan lines 12, the common line 16 also causes the aperture ration to decrease. Therefore, the aperture ratio of the liquid crystal display device 10C according to the first comparative example is inevitably lower than that of the liquid crystal display devices 10A and 10B according to the first and second embodiments.

Second Comparative Example

Figure 12:
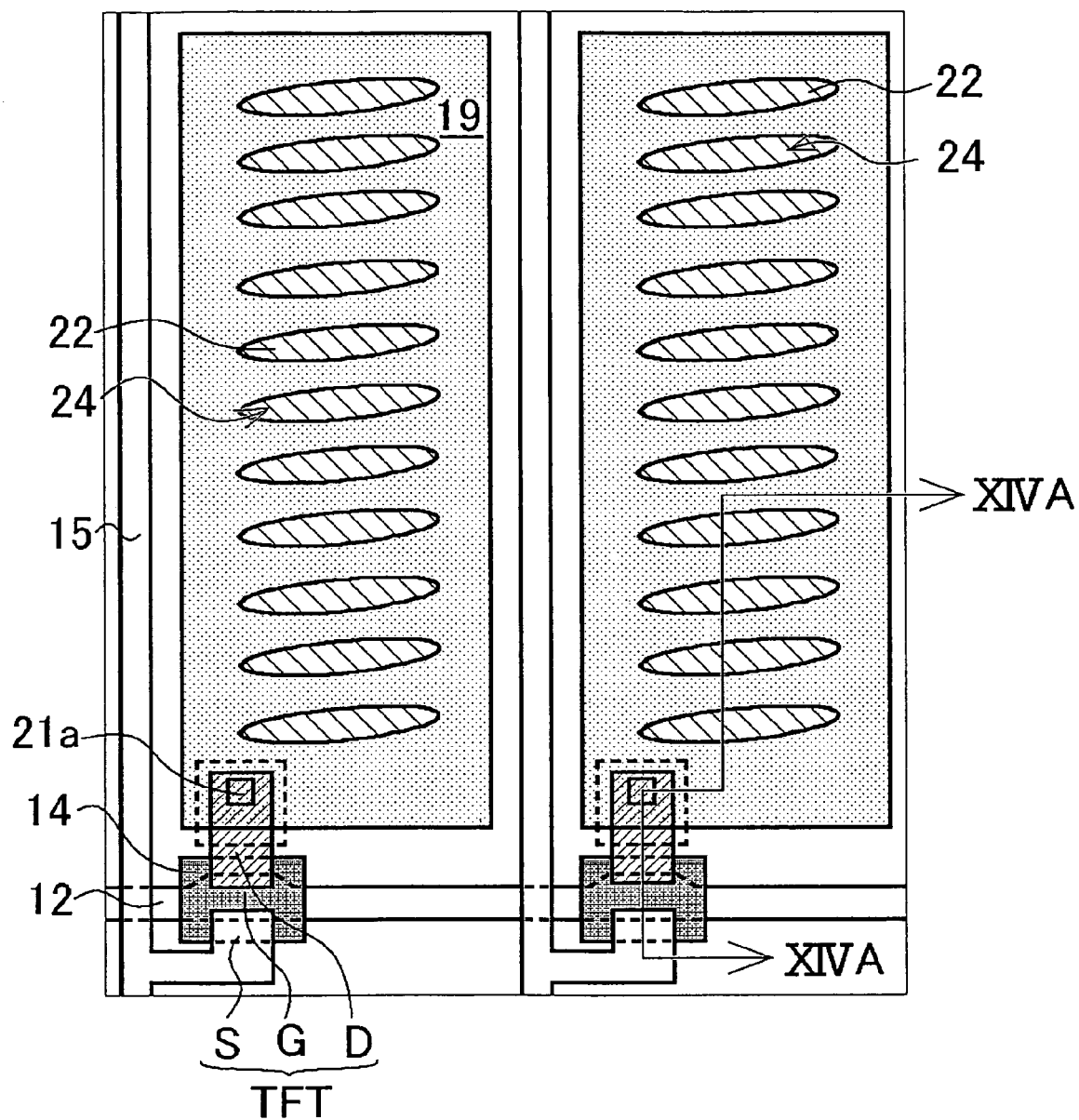
FIG. 12 is a schematic plan view showing two pixels of an array substrate of a liquid crystal display device according to a second comparative example.
Figure 13:
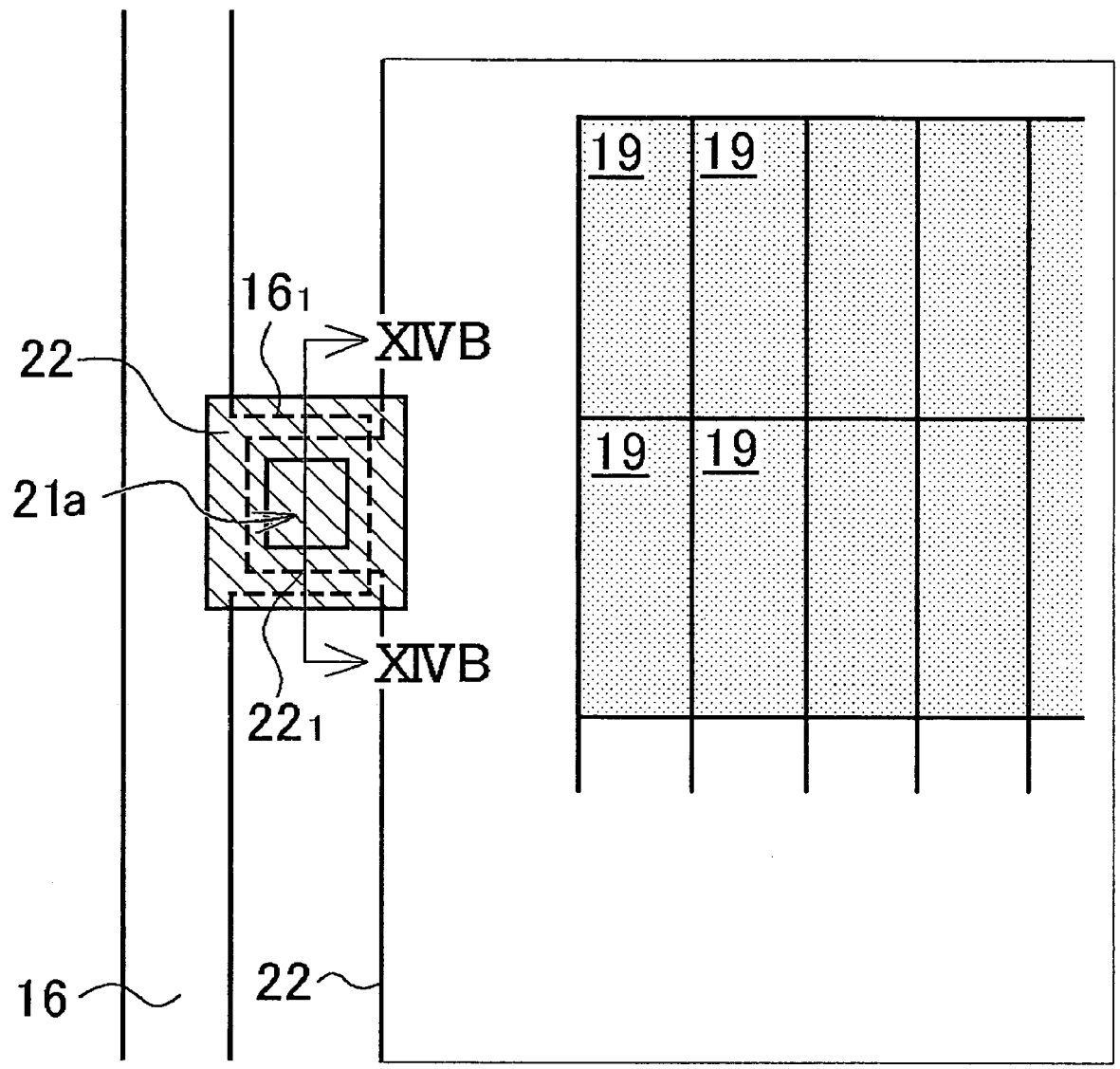
FIG. 13 is an enlarged plan view of the array substrate at an X portion of the liquid crystal display device according to the second comparative example.
Figure 14A:
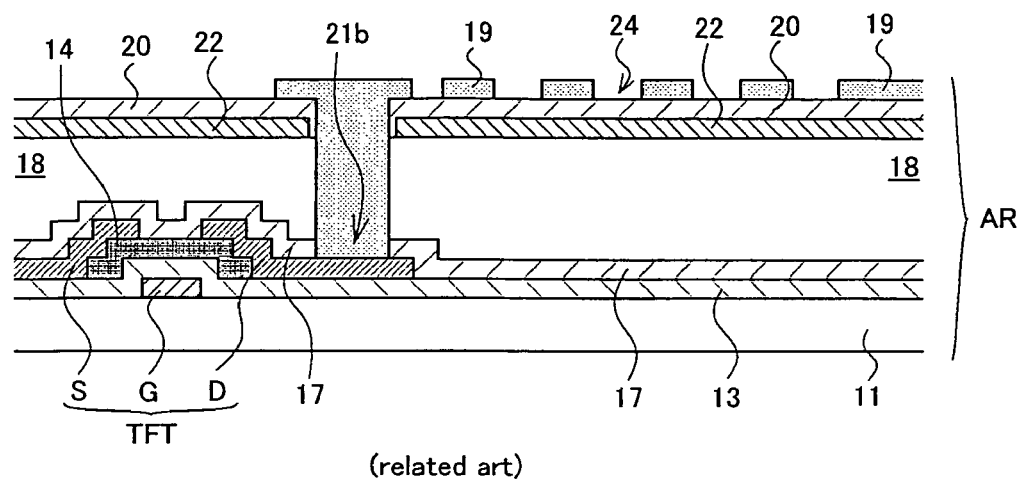
FIG. 14A is a schematic sectional view along the line XIVA-XIVA of FIG. 12.
Figure 14B:
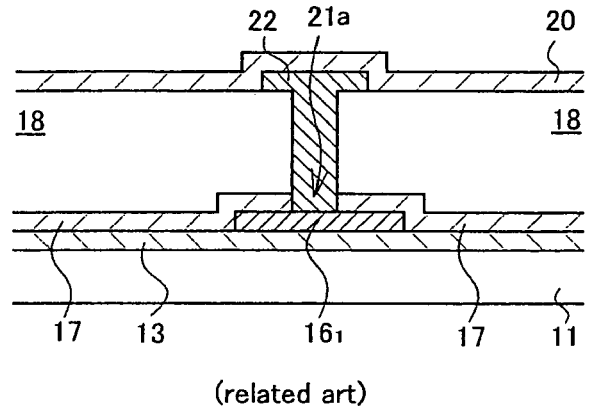
FIG. 14B is a schematic sectional view along the line XIVB-XIVB of FIG. 13.

Next, in order to confirm the advantageous effects of the embodiments of the invention, a second comparative example describes an example of an FFS mode liquid crystal display device having a planarization film in the order of the manufacturing steps using FIGS. 12 to 14. FIG. 12 is a schematic plan view showing two pixels of an array substrate of the liquid crystal display device according to the second comparative example. FIG. 13 is an enlarged plan view of the array substrate at an X portion of the liquid crystal display device according to the second comparative example. FIG. 14A is a schematic sectional view along the line XIVA-XIVA of FIG. 12, and FIG. 14B is a schematic sectional view along the line XIVB-XIVB of FIG. 13. Note that the same components as those of the FFS mode liquid crystal display device 10A according to the first embodiment shown in FIGS. 1 to 3 are denoted by the same reference symbols in FIGS. 12 to 14, and a detailed description thereof is omitted. Also, since the connection position between the common line and the common electrode in the liquid crystal display device according to the second comparative example is similar to the connection position X between the common line and the common electrode in the liquid crystal display device 10A according to the first embodiment shown in FIG. 2, FIG. 2 is appropriately used as a reference.

The steps of forming the scan line 12, the gate insulator 13, the semiconductor layer 14, the signal line 15 including the source electrode S, the drain electrode D, the source line, the common line 16 and the connection portion 16$_1$ thereof, the passivation film 17, and the planarization film 18 on the transparent substrate 11 of the array substrate AR of an FFS mode liquid crystal display device 10D according to the second comparative example are substantially the same as those in the manufacturing steps of the array substrate AR of the FFS mode liquid crystal display device 10A according to the first embodiment. Therefore, a detailed description thereof is omitted.

After the planarization film 18 is formed, the first contact hole 21a is formed at the connection position X (see FIG. 2) between the common electrode 22 described below and the common line 16 to extend through the planarization film 18 on the connection portion 16$_1$ and the passivation film 17, so as to expose the surface of the connection portion 16$_1$. Next, a transparent conductive layer formed of an ITO or IZO film is formed over the whole surface of the transparent substrate 11 to which the planarization 18 is provided, and the common electrode 22 is formed with a predetermined pattern by a photolithography method and an etching method. Simultaneously, a hole larger the second contact hole 21b is formed at a position where the second contact hole 21b described below is to be formed. The common electrode 22 and the connection portion 16$_1$ of the common line 16 are thus electrically connected by the transparent conductive layer in the first contact hole 21a.

Next, the insulator 20 formed of a silicon nitride layer or silicon oxide layer is formed with a predetermined thickness over the whole surface of the substrate 11 to which the common electrode 22 is provided. At this time, the hole larger than the second contact hole 21b formed on the common electrode 22 is filled with the insulator 20. Further, the second contact hole 21b is formed to extend from the surface of the insulator 20 through the insulator 20, the planarization film 18, and the passivation film 17 to the surface of the drain electrode D. The common electrode 22 is not exposed at the wall surrounding the contact hole 21b.

Next, a transparent conductive layer formed of an ITO or IZO film is formed over the whole surface of the substrate 11 to which the second contact hole 21b is provided. The transparent conductive layer is thus electrically connected with the drain electrode D via the second contact hole 21b.

Then, the pixel electrode 19 having a predetermined pattern is formed for each sub-pixel region by a photolithography method and an etching method. Simultaneously, the plurality of slits 24 for creating parallel fringe field effects are formed on each pixel electrode 19. In this manner, each pixel electrode 19 is electrically connected with the drain electrode D via the second contact hole 21b.

Then, an alignment layer (not shown) is provided over the whole surface on the pixel electrode 19 side to complete the array substrate AR of the liquid crystal display device 10D according to the second comparative example. The subsequent manufacturing steps are the same as the manufacturing steps of the liquid crystal display device 10A according to the first embodiment. Therefore, a detailed description thereof is omitted.

The FFS mode liquid crystal display device 10D thus prepared has optical properties substantially similar to those of the FFS mode liquid crystal display devices 10A and 10B according to the first and second embodiments. However, the two contact holes of the liquid crystal display device 10D according to the second comparative example need to be formed on separate steps. Therefore, one extra step of manufacturing the contact hole is added in the manufacture of the FFS mode liquid crystal display device 10D according to the second comparative example, compared to the manufacturing steps of the liquid crystal display devices 10A and 10B according to the first and second embodiments.

Note that although the slits 24 provided to the pixel electrode 19 according to the first and second embodiments have a shape in which both ends in the longitudinal direction are closed as an example, the slits may have an opened end on one side. In this case, the fringe field effect can reach the opened end portion on one side of each slit. Further, since there are few misalignments of liquid crystal molecules on the opened end portion side of the slit, the area in which light shielding by a black matrix provided to a color filter substrate is necessary decreases compared to a liquid crystal display in which both ends of the slit are closed. Thus, a liquid crystal display device having a large display aperture ratio and bright display can be obtained.

What is claimed is:
1. A liquid crystal display device comprising:
   a pair of transparent substrates sandwiching a liquid crystal layer;
   one of the pair of transparent substrates on the liquid crystal layer side being provided with:
      a plurality of scan lines and a plurality of signal lines disposed in a matrix in a display region;
      a switching element provided near an intersection of the plurality of scan lines and the plurality of signal lines;
      a common line formed along a periphery portion of the display region;
      a planarization film formed over at least the whole display region;
      a first electrode formed on a surface of the planarization film;
      an insulator formed on the first electrode; and a second electrode formed on the insulator and having a plurality of slits for each position corresponding to a region divided by the plurality of scan lines and the plurality of signal lines;

the second electrode being electrically connected with the common line or the switching element via a first contact hole formed on the insulator and the planarization film;

the first electrode being electrically connected with the switching element or the common line, different from the common line or the switching element with which the second electrode is electrically connected, via an interface-structured conductive path, formed of a material used for forming the second electrode, formed via a second contact hole on the insulator, a surface of the insulator, and a third contact hole formed on the insulator and the planarization film.

2. The liquid crystal display device according to claim 1, wherein the first electrode is formed on the surface of the planarization film in the display region for each position corresponding to the region divided by the plurality of scan lines and the plurality of signal lines, each first electrode being electrically connected with the corresponding switching element; and the second electrode is formed at least over a whole surface of the display region of the insulator and connected with the common line.

3. The liquid crystal display device according to claim 2, wherein the interface-structured conductive path is formed for each position corresponding to the region divided by the plurality of scan lines and the plurality of signal lines.

4. The liquid crystal display device according to claim 2, wherein a plurality of connections are formed between the second electrode and the common line.

5. The liquid crystal display device according to claim 1, wherein the first electrode is formed over the whole surface of the planarization film in the display region and connected with the common line; and the second electrode is formed for each position corresponding to the region divided by the plurality of scan lines and the plurality of signal lines on the surface of the insulator in the display region, each second electrode being electrically connected with the corresponding switching element.

6. The liquid crystal display device according to claim 5, wherein the interface-structured conductive path is formed at a boundary portion between the common line and the display region.

7. The liquid crystal display device according to claim 5, wherein the interface-structured conductive path is provided in plurality.

8. A method of manufacturing a liquid crystal display device, the method comprising:
(1) preparing a first transparent substrate including a plurality of scan lines and a plurality of signal lines formed in a matrix in a display region, a switching element provided near an intersection of the plurality of scan lines and the plurality of signal lines, and a common line formed along a periphery portion of the display region;
(2) forming a planarization film at least over the whole display region of the first transparent substrate;
(3) forming a first electrode on a surface of the planarization film;
(4) forming an insulator over a whole surface of the resulting first transparent substrate after (3);
(5) forming first and third contact holes in the insulator and the planarization film to expose the switching element and the common line, and forming a second contact hole in the insulator to expose the first electrode;
(6) forming a film formed of a conductive material over the whole surface of the resulting transparent substrate after (5), forming by etching a second electrode including a plurality of slits for each position corresponding to a region divided by the plurality of scan lines and the plurality of signal lines, electrically connecting the second electrode and the switching element or the common line via the first contact hole, and electrically connecting the first electrode and the common line or the switching element via an interface-structured conductive path formed via the second contact hole, a surface of the insulator, and the third contact hole, and
(7) disposing a second transparent substrate to face a surface of the resulting first transparent substrate after (6) at a predetermined distance, and encapsulating a liquid crystal between the first and second transparent substrates.

\* \* \* \* \*